(12) United States Patent
Greenwood et al.

(10) Patent No.: US 8,753,044 B2
(45) Date of Patent: Jun. 17, 2014

(54) L-VALVE CONSTRUCTION FOR CONTROLLING SOLIDS FLOW IN A LIQUID MEDIUM USING STANDARD PIPE FITTINGS

(75) Inventors: Arthur R. Greenwood, Niles, IL (US); Dale J. Shields, Grayslake, IL (US); Jessy E. Trucko, Glendale Heights, IL (US); Sailesh B. Kumar, Naperville, IL (US)

(73) Assignee: UOP LLC, Des Plaines, IL (US)

( * ) Notice: Subject to any disclaimer, the term of this patent is extended or adjusted under 35 U.S.C. 154(b) by 1773 days.

(21) Appl. No.: 12/135,353

(22) Filed: Jun. 9, 2008

(65) Prior Publication Data

US 2009/0304465 A1   Dec. 10, 2009

(51) Int. Cl.
*B65G 53/40* (2006.01)
*B65G 53/42* (2006.01)
*B65G 53/50* (2006.01)

(52) U.S. Cl.
CPC ............... *B65G 53/40* (2013.01); *B65G 53/42* (2013.01); *B65G 53/50* (2013.01)
USPC .......................................... 406/108; 406/144

(58) Field of Classification Search
USPC .......................... 406/195, 108, 127, 144, 145
See application file for complete search history.

(56) References Cited

U.S. PATENT DOCUMENTS

| | | | | |
|---|---|---|---|---|
| 749,206 A * | 1/1904 | Limbert | ........................... | 406/93 |
| 1,524,070 A * | 1/1925 | West | .............................. | 406/108 |
| 2,500,271 A * | 3/1950 | Bozich | ............................ | 406/93 |
| 2,623,793 A * | 12/1952 | Hill | ................................... | 406/14 |
| 2,684,869 A * | 7/1954 | Lapple | ........................... | 222/637 |
| 2,723,883 A * | 11/1955 | Lapple | ........................... | 406/194 |
| 2,789,868 A * | 4/1957 | May | ................................ | 406/93 |
| 2,919,159 A * | 12/1959 | Lacroix | .......................... | 406/137 |
| 3,239,278 A * | 3/1966 | Mueller et al. | .................. | 406/94 |
| 3,874,739 A * | 4/1975 | Mitchell | ........................ | 406/94 |
| 3,957,459 A * | 5/1976 | Mitchell et al. | ............. | 48/197 R |
| 4,002,372 A * | 1/1977 | Edwards et al. | ................ | 406/94 |
| 4,367,685 A * | 1/1983 | Frame et al. | ................... | 110/347 |
| 4,374,540 A * | 2/1983 | Massey et al. | ................. | 165/279 |
| 4,645,884 A | 2/1987 | Barazeche et al. | ............ | 379/406 |
| 4,685,842 A | 8/1987 | Smith et al. | .................... | 406/106 |
| 4,687,382 A | 8/1987 | Smith | ........................... | 406/168 |
| 4,709,663 A * | 12/1987 | Larson et al. | ................. | 122/4 D |
| 4,938,171 A | 7/1990 | Detzel et al. | ................... | 122/4 D |
| 5,273,721 A | 12/1993 | Hallstrom | ..................... | 422/147 |
| 5,341,766 A | 8/1994 | Hyppanen | ..................... | 122/4 D |
| 5,376,261 A | 12/1994 | Avidan | ........................... | 208/157 |
| 5,540,894 A | 7/1996 | Hyppanen | ..................... | 422/146 |
| 5,588,787 A * | 12/1996 | Manjunath et al. | ............. | 406/85 |

(Continued)

FOREIGN PATENT DOCUMENTS

| | | | | |
|---|---|---|---|---|
| EP | 109790 A2 | 5/1984 | ................. | B01J 7/00 |
| EP | 84887 B1 | 11/1985 | ................. | B01J 8/24 |
| GB | 2410200 A | 7/2005 | ............. | F23D 14/38 |
| WO | WO9631418 A1 | 10/1996 | ............ | B65G 53/16 |

*Primary Examiner* — William R Harp
(74) *Attorney, Agent, or Firm* — Mark R Willis

(57) ABSTRACT

A new valve is designed for the transport of solids using a motive fluid. The valve includes an inlet conduit for carrying solids, where the solids are fed through gravity. The solids are carried by fluid transport out an outlet where the outlet conduit has a smaller diameter than the inlet conduit carrying the solids. The conduit should be sufficiently smaller to prevent instability in the flow. A second inlet provides the source of motive fluid to drive the transport of solids.

6 Claims, 4 Drawing Sheets

(56) References Cited

U.S. PATENT DOCUMENTS

| | | | |
|---|---|---|---|
| 5,672,798 A | 9/1997 | Zhang et al. | 585/467 |
| 5,716,516 A * | 2/1998 | Micklich | 208/174 |
| 5,728,353 A | 3/1998 | Govoni et al. | 422/145 |
| 6,392,114 B1 | 5/2002 | Shields et al. | 585/719 |
| 6,486,374 B1 | 11/2002 | Radcliffe et al. | 585/714 |
| 6,557,598 B2 * | 5/2003 | Glover et al. | 141/387 |
| 6,881,391 B1 | 4/2005 | Sechrist | 423/240 S |
| 6,967,005 B2 | 11/2005 | Wietzke et al. | 422/171 |

* cited by examiner

L-VALVE CONSTRUCTION FOR CONTROLLING SOLIDS FLOW IN A LIQUID MEDIUM USING STANDARD PIPE FITTINGS

BACKGROUND OF THE INVENTION

This invention relates to the conveying of particulate solid materials, and particularly the handling of solid particulate materials where the solids are transported by a fluid.

BACKGROUND OF THE INVENTION

There are many processes in the petrochemical industry that use catalysts and adsorbents. The catalysts and adsorbents are frequently transferred between operational units and regeneration units, and often there is a continuous flow of the catalyst and/or adsorbent through the system comprising the operational unit and the regeneration unit.

One common system that requires the continuous flow of solids is a transport reactor. In hydrocarbon processing, transport reactors are commonly used. In a transport reactor the catalyst bed moves through the reactor where the catalyst contacts the reactants. This is different from fixed bed reactors where the catalyst is held in place by screens or other devices, or ebullated bed reactors where the catalyst particles circulate within the reactor, but are not carried out of the reactor. In a transport reactor, the catalyst is carried through the reactor by the fluid reactants passing through the reactor. Although the general direction for a transport reactor is in an upward direction, it can also be downward, horizontal, or at some angle in between horizontal and vertical. In the case where the reactor is vertical and the transport is in the upward direction, the reactor is called a riser reactor, where the catalyst is introduced in the bottom of the reactor and is carried up through the reactor.

Riser reactors are commonly used in hydrocarbon processing. A fluid hydrocarbon reactant contacts a solid catalyst carried along by a fluid, where the catalyst and fluid are introduced at the bottom of the reactor and the fluid and catalyst rise up through the reactor in a fluidized state during which the process reaction takes place. Upon exiting the riser reactor, the fluid and catalyst enter a separation zone where the catalyst disengages from the fluid and settles by gravity to the bottom of the separation zone. The catalyst is then withdrawn and sent to a regeneration unit, before recirculation to the riser reactor.

Several methods are used for controlling the introduction of solid catalysts to the bottom of a riser reactor, or for any process unit where a solid is introduced and carried through the process unit. The means for control include slide valves, lock hoppers, screw conveyors and L-valves, to name a few. The L-valve is a specific type of a non-mechanical valve. These valves have no moving parts and control the flow of solids through the introduction of a fluid to carry the solids along. In an L-valve, solids are fed by gravity to a downcomer, or a vertical pipe. The downcomer intersects a horizontal pipe, or exit arm, giving the appearance similar to the letter "L". A motive fluid inlet located at the junction opposite the exit arm, or intersecting the vertical leg proximate to the "L" junction provides the energy to carry the solids out the exit arm. Control of the L-valve is through the control of the flow of a motive fluid to carry the solids out the exit arm. The solids flow includes fluid transported with the solids down through the vertical pipe, where the fluid in the horizontal pipe provides a motive force to facilitate all of the fluid carrying solids out the second arm, or exit of the L-valve. Generally, the solids flow rate can be controlled by adjusting the rate at which fluid is introduced at the junction. However, there are control problems due to flow instabilities for certain flow regimes, and notably when the fluid is a liquid.

Accordingly, there is a need for improved apparatuses to reliably feed solids at a controlled and reproducible rate while reducing the attrition of catalysts and adsorbents in systems with continuous solids circulation.

BRIEF SUMMARY OF THE INVENTION

In a transport reactor, where a solid catalyst is circulated through the reactor, the flow of solid catalyst can be controlled by several means. One method is the use of an L-valve. An L-valve is a valve for controlling the flow of solids without the use of mechanical parts, but through control of a motive fluid to carry the solids. An L-valve of the present invention comprises a first inlet conduit for carrying solids and having a first diameter, and an outlet conduit having a second diameter, where the second diameter is less than 80% of the first diameter. The outlet conduit is oriented at an angle between 45 degrees and 135 degrees relative to the first inlet conduit. The L-valve further includes a second inlet for the admission of a motive fluid, and where the second inlet is substantially aligned with the outlet conduit. The use of the L-valve generally has the first inlet conduit oriented vertically and the solids are fed by gravity to the first inlet conduit. And the outlet is substantially oriented horizontally at a right angle to the first inlet conduit.

Other objects, advantages and applications of the present invention will become apparent to those skilled in the art from the following detailed description and drawings.

DETAILED DESCRIPTION OF THE INVENTION

It is important to transport a solid material in a smooth manner with little or no holdup, and to prevent the solid from being ground up, thereby reducing the usefulness of the solid. It has been found that with a liquid flowing medium in an L-valve, there is a region of instability and where good control is not achievable, particularly in a liquid medium, with an L-valve as described in the literature. Physical modeling tests were performed to determine how to overcome the instability flow problem, and it was discovered that the control problem was overcome by making the horizontal line in the L-valve smaller than the vertical downcomer, or providing a restriction in the horizontal line, such as a flat plate with an orifice of smaller diameter than the vertical downcomer. It was found that providing the line size reduction was most effective, providing stable control with a minimum of additional pressure loss, if the change was a sudden contraction at the inlet of the horizontal line.

Figure 1:
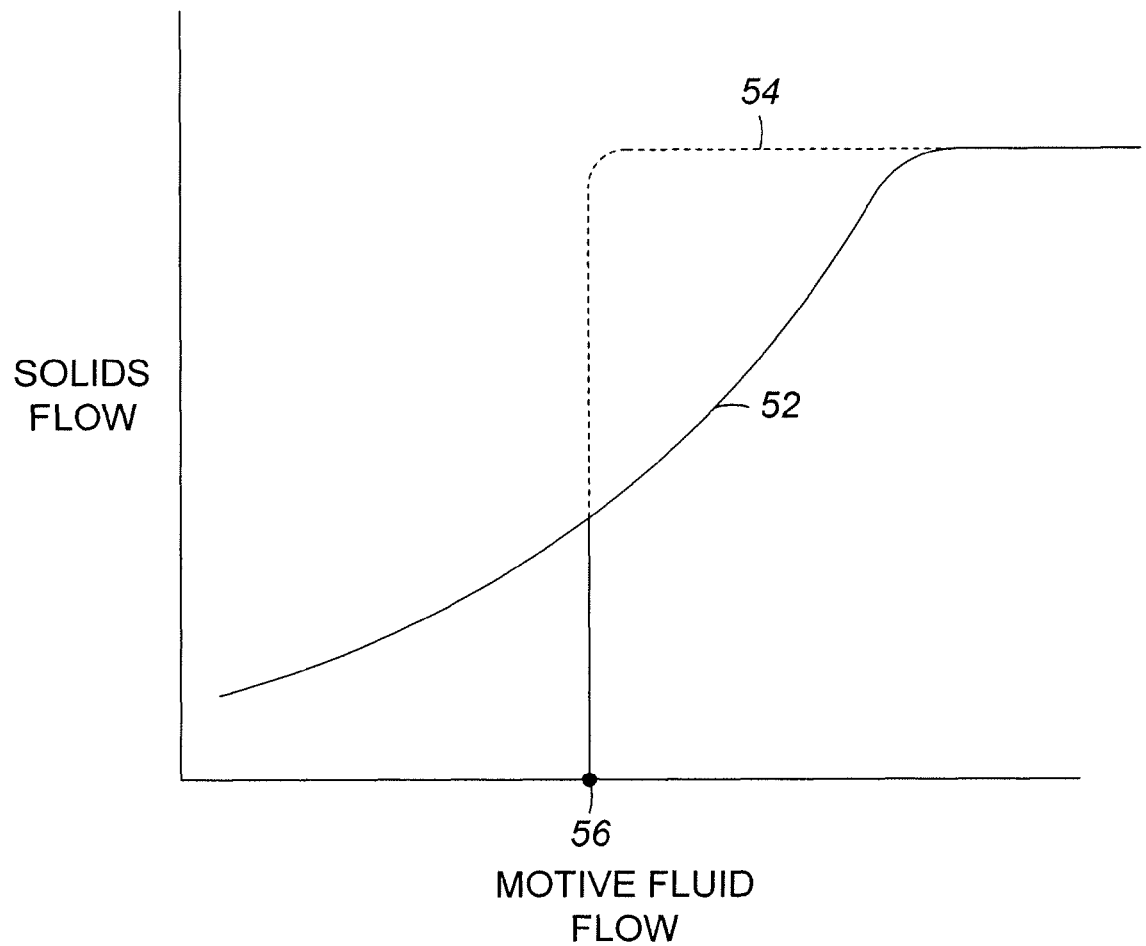
FIG. 1 is a diagram of the instability control problem.

The instability problem can be seen in the representational diagram of FIG. 1. Without the instability, the flow should follow a smooth curve 52 providing control of the solids flow through adjusting the motive fluid flow. With the instability flow 54, the flow of solids suddenly becomes very high, and stays at a higher level of solids flow, or circulation, through a broad range of motive fluid flow. The solids flow increases gradually to a threshold level 56, where a jump in solids flow occurs, resulting in loss of control over the rate of solids flow. While the preferred operation is with a liquid motive fluid, a dense gas is also believed to have similar behaviors, and therefore the term fluid will be used hereinafter to encompass the use of either a liquid or a dense gas or vapor.

In experiments to understand the flow problems, the motive fluid used was liquid water and the particulate solids were glass beads. The experiments consisted of operating L-valves constructed of standard steel or plastic pipe fittings varying from ¾" to 4" nominal size over a range of solids flows from zero to the point where no increase in solids rate could be achieved, or the solids get fluidized in the L-valve vertical inlet line. The solids flow was controlled by adjusting the liquid flow to the L-valve junction, and at a threshold liquid addition rate the solids flow jumped out of control, where the solids flow increased to a high level and remained at that level.

Figure 2:
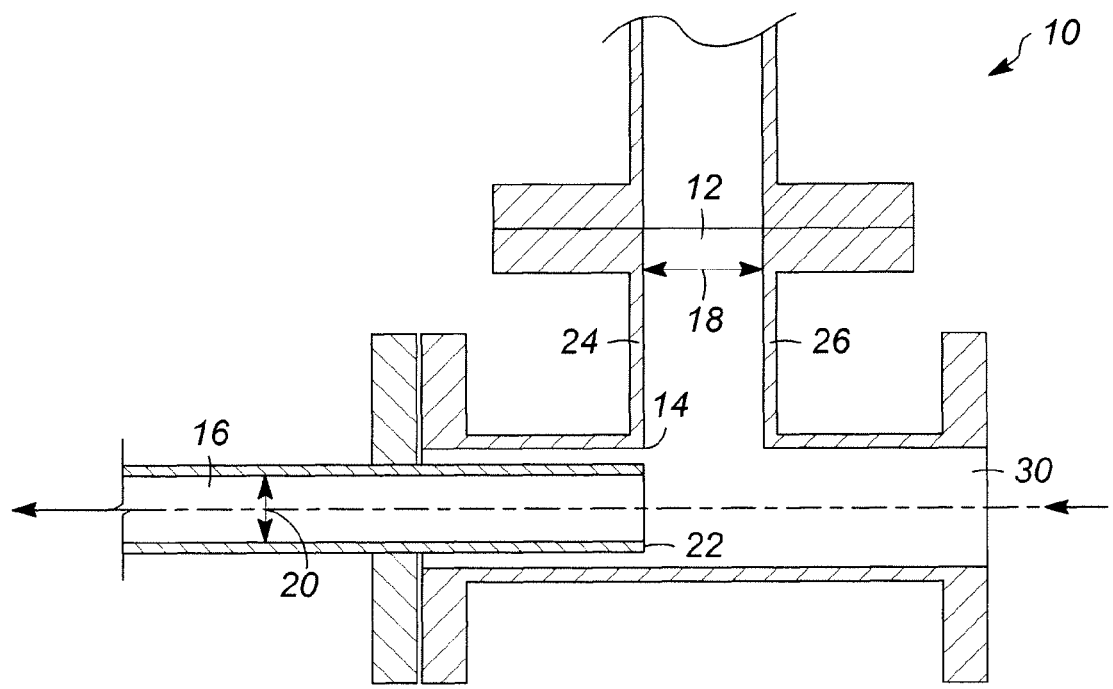
FIG. 2 is a diagram of an embodiment of the L-valve of the present invention.

The invention is a valve for the transport of solids with a fluid. The control of the flow of solids is important for the control of processes that have a continuous flow of solids, such as transport reactors where a fluid carries solid catalyst into a reactor. The valve 10, as shown in FIG. 2, comprises a first inlet conduit 12 for carrying solids, and having a first inlet conduit end 14. The valve 10 further includes an outlet conduit 16 oriented at an angle between 45 degrees and 135 degrees relative to the first inlet conduit 12. The inlet conduit 12 has a first diameter 18, and the outlet conduit 16 has a second diameter 20, where the second diameter 20 is less than 80% of the first diameter 18, and the outlet conduit 16 has an outlet conduit end 22. The first inlet conduit 12 has a side 24 proximate to the outlet conduit end 22, and a side 26 distal to the outlet conduit end 22. While the configuration in FIG. 2 shows the T intersection for the L-valve, the inlet conduit 12 includes a vertical pipe that extends upward for the complete vertical portion of the inlet conduit. The length and pressure differential in the entire inlet conduit is a factor in determining the amount of motive fluid required in the operation of the L-valve. The configuration in FIG. 2 indicates the use of a flanged T for the L-valve. This facilitates the maintenance and/or replacement of parts, but is not necessary for this invention. In one embodiment, the outlet conduit end 22 is substantially aligned with the proximate side 24 of the first inlet conduit 12. The valve further includes a second inlet for carrying fluid, and where the second inlet 30 is substantially aligned with the outlet conduit 16.

In an L-valve, the general configuration is that the outlet is approximately at a right angle to the solids inlet conduit 12, and it is preferred that the outlet conduit 16 be oriented at an angle between 80 degrees and 100 degrees relative to the first inlet conduit 12. The operation of the L-valve is partially controlled by the gravity feeding of solids into the solids conduit 12, and it is preferred that the first inlet conduit be oriented at an angle within 20 degrees of vertical, where the vertical is the direction parallel to the direction of gravity.

In a preferred configuration, the second diameter 20, or diameter of the outlet conduit 20, is between 50% and 75% of the first diameter 18, or diameter of the solids inlet conduit 12. By reducing the outlet diameter 20 size relative to the solids inlet diameter 18, the flow produced by the motive fluid carrying the solids and fluid entering from the first inlet 12, is stabilized and can be smoothly controlled through the desired range of motive fluid and solid flows as depicted by curve 52 in FIG. 1.

Figure 3:
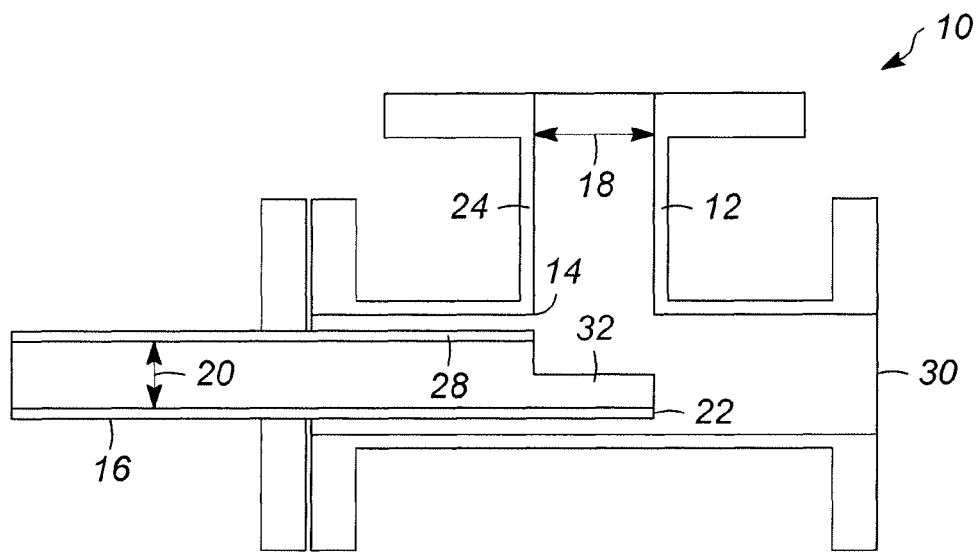
FIG. 3 is a diagram of a second embodiment of the present invention with the outlet conduit end extending partially across the first inlet conduit end, and with a portion of the upper part of the conduit wall removed.

In an alternate embodiment, the L-valve 10 includes an outlet conduit 16 with an outlet conduit end 22 where the outlet conduit end 22 extends a distance across the solids inlet conduit end 14. In this embodiment, as shown in FIG. 3, the valve 10 comprises a first inlet conduit 12 for carrying solids and having a first diameter 18 and a first inlet conduit end 14. The valve 10 further includes an outlet conduit 16 having a second diameter 20, where the second diameter 20 is less than the first diameter 18, and where the outlet conduit 16 is oriented at an angle between 45 degrees and 135 degrees relative to the first inlet conduit 12. The valve 10 includes a second inlet 30 for carrying the motive fluid, and is substantially aligned with the outlet conduit 16. The outlet conduit end 22 extends at least 20% of the distance across the first inlet conduit end 14. It is preferred that the outlet conduit which comprises an outlet conduit wall 28 has a portion of the outlet conduit wall nearest the first inlet conduit end 14 removed from the outlet conduit end 22 to a position on the outlet conduit that intersects the first inlet conduit 12, at the first inlet conduit side 24 that is proximate to the outlet conduit 16.

For this valve, the general configuration is for the solids inlet conduit 12 to have a vertical orientation, and the outlet conduit 16 to have a horizontal orientation, and it is preferred that the outlet conduit 16 is oriented at an angle between 80 degrees and 100 degrees relative to the solids inlet conduit 12. The outlet conduit 16 is preferred to have a diameter less than 80% of the diameter of the first inlet conduit 12, and more preferably to have a diameter between 50% and 75% of the first diameter 18.

In this embodiment, the configuration of the outlet conduit 16 relative to the first inlet conduit 12 allows for a smoother transition of particle flow into the outlet conduit 16. The portion of the outlet conduit wall 28 that is removed creates an open section of the outlet conduit 16 where solid catalyst can flow down from the inlet conduit 12 to the outlet conduit 16. The portion of the outlet conduit wall is between 25% and 95% of the outlet conduit wall 28 for the section that extends across the first inlet conduit end 14. In a preferred embodiment, the removed portion is between 50% and 70% of the outlet conduit wall 28 and forms a partially open channel 32 on the end of the outlet conduit 16.

With this embodiment, the outlet conduit 16 extends preferably at least 50% of the distance across the first inlet conduit end 14 as measured by the diameter 18 of the first inlet conduit 12, and more preferably at least 100% of the distance. The outlet conduit 16 with a portion of the outlet conduit wall 28 removed is preferred to have the exposed edges along the removed section rounded.

The construction of the L-valve of the present invention can be made through the use of standard pipe fittings. This saves considerable expense over custom casting of L-valves, and especially for systems where the operating pressures are high, and for example can exceed 4 MPa. Standardized materials can be chosen that have already been fabricated for operating conditions one expects to encounter. A T-intersection provides the base, with a first standard pipe attachment to form the vertical leg of the L-valve. A second standard pipe having an inside diameter 20 less than 80% of the first standard pipe's inside diameter 18 is then attached through a blind flange with appropriate standard fittings and seals to join the second pipe with the T-intersection. Other fittings and arrangements are available with standard piping materials, with the criteria of an outlet conduit size reduction relative to the solids inlet conduit controlling the decision process.

Figure 4:
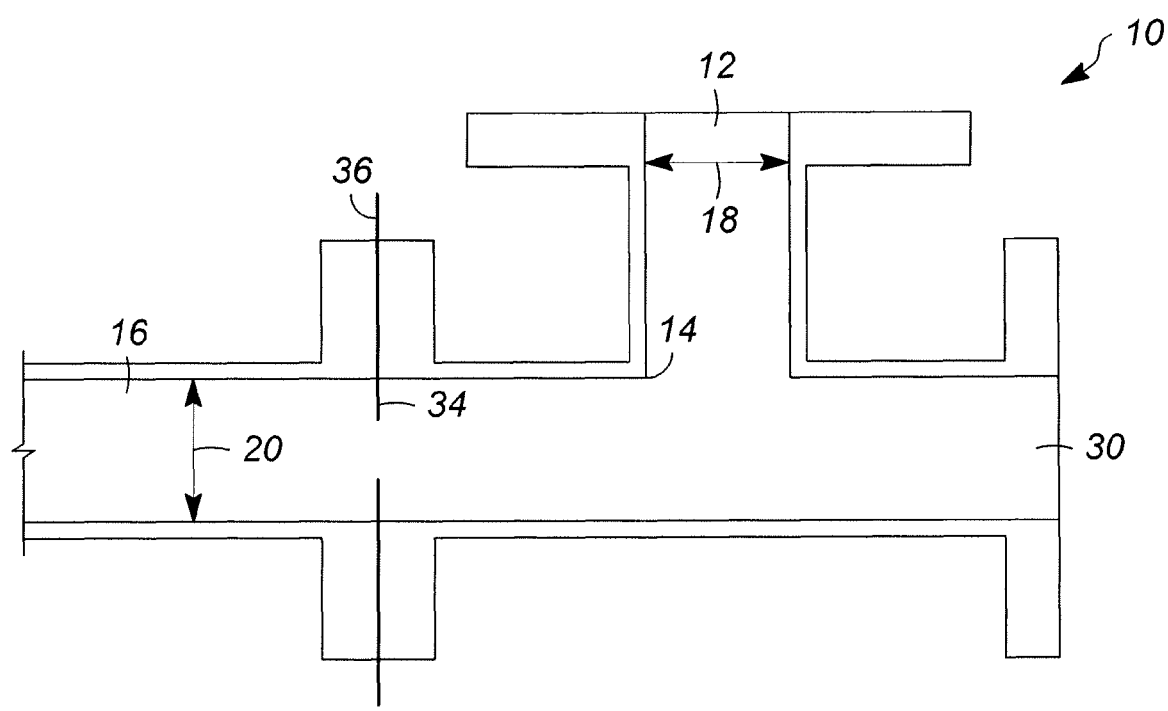
FIG. 4 is a diagram of a third embodiment of the present invention where a dam or other obstruction is used in the outlet conduit instead of a conduit diameter reduction.

In a second alternate embodiment, the L-valve 10 includes an outlet conduit 16 that is the same diameter as the inlet conduit, but includes a "dam" or other partial obstruction of the outlet conduit. In this embodiment, as shown in FIG. 4, the valve 10 comprises a first inlet conduit 12 for carrying solids and having a first diameter 18 and a first inlet conduit end 14. The valve 10 further includes an outlet conduit 16 having a diameter 20, where the second diameter 20 is the same as the first diameter 18, and where the outlet conduit 16 is oriented at an angle between 45 degrees and 135 degrees relative to the first inlet conduit 12. The valve 10 includes a second inlet 30 for carrying the motive fluid, and is substantially aligned with the outlet conduit 16. The outlet conduit includes an obstruction 34 that reduces the cross sectional area of a portion of the outlet conduit 16 to between 25% and 75% of the cross sectional area of the first inlet conduit 12, and preferably less than 50% of the cross sectional area of the first inlet conduit end 14. The opening at the point of the obstruction 34 may be of a shape appropriate to the requirements of the flowing fluid properties. It may be an orifice plate 36 centered in the outlet conduit 16, or placed eccentrically and aligned with the top or bottom edge of the conduit, as may be dictated to make the line free draining or able to pass entrained vapor. The orifice plate 36 may also comprise an opening such as a semi-circular section, or other shape opening, to block a portion of the cross-sectional area.

Figure 5:
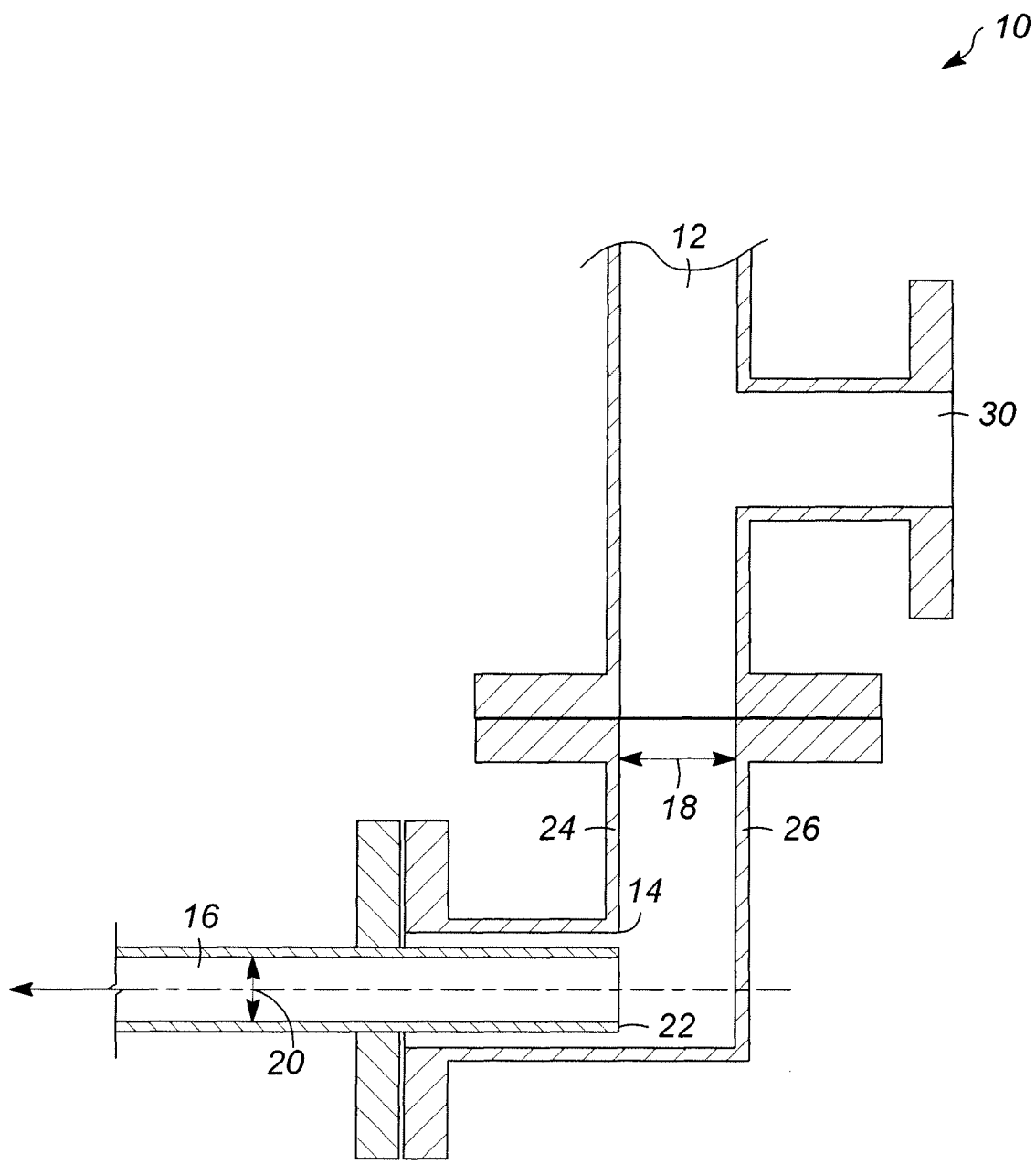
FIG. 5 is a diagram of an embodiment with the motive liquid positioned on the downcomer.

An alternate construction of the present invention, the motive fluid inlet 30 can be positioned above the junction of the first inlet conduit 12 with the outlet conduit 16, as shown in FIG. 5. In this embodiment, the valve 10 comprises a first inlet conduit 12 for carrying solids having a substantially vertical orientation. The valve 10 further includes an outlet conduit 16 having a substantially horizontal orientation. The inlet conduit 12 has a first diameter 18, and the outlet conduit 16 has a second diameter 20, where the second diameter 20 is less than 80% of the first diameter 18, and preferably less than 75% of the first diameter 18. The second inlet 30 for admission of the motive fluid is disposed in the first inlet conduit 12 and can be positioned near the outlet conduit 16, or substantially above the junction of the first inlet conduit 12 with the outlet conduit 16. This embodiment can also include a construction where the outlet conduit 16 has the same diameter as inlet conduit 12, but a restriction is disposed within the outlet conduit 16, such as an orifice plate, or other restriction as described above, where the cross-sectional area is reduced to between 25% and 75% of the cross-sectional area of the first inlet conduit 12.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. A valve for the transport of solids with a fluid, comprising:
   a first inlet conduit for carrying solids having a first diameter and having a first inlet conduit end, wherein the first inlet conduit includes a first pipe;
   an outlet conduit having a second diameter that is between 50% and 75% of the first diameter, and oriented at an angle between 45 degrees and 135 degrees relative to the first inlet conduit, where the outlet conduit has an outlet conduit end and the first inlet conduit has a side that is proximate to the outlet conduit end and a side distal to the outlet conduit end, and where the outlet conduit end is aligned with the first inlet conduit side that is proximate to the outlet conduit end, wherein the outlet conduit includes a second pipe; and
   a second inlet conduit for carrying fluid and wherein the outer diameter of the outlet conduit is less than an inner diameter of the second inlet conduit.

2. The valve of claim 1 wherein the second inlet conduit is located at a position above the first inlet conduit end and enters in the first inlet conduit.

3. The valve of claim 1 wherein the outlet conduit is oriented at an angle between 80 degrees and 100 degrees relative to the first inlet conduit.

4. The valve of claim 1 wherein the first inlet conduit is oriented at an angle between vertical and 20 degrees from vertical.

5. The valve of claim 1 wherein the second inlet conduit is substantially aligned with the outlet conduit.

6. The valve of claim 1 wherein the fluid is a liquid.

\* \* \* \* \*